(12) United States Patent
Yasukawa (10) Patent No.: US 8,982,371 B2
(45) Date of Patent: Mar. 17, 2015

(54) IMAGE FORMING APPARATUS, CONTROL METHOD OF IMAGE FORMING APPARATUS, AND STORAGE MEDIUM

(71) Applicant: Canon Kabushiki Kaisha, Tokyo (JP)

(72) Inventor: Akari Yasukawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/764,019

(22) Filed: Feb. 11, 2013

(65) Prior Publication Data

US 2013/0208292 A1    Aug. 15, 2013

(30) Foreign Application Priority Data

Feb. 14, 2012    (JP) .................................. 2012-029127

(51) Int. Cl.
*G06F 3/12* (2006.01)
*G06K 15/00* (2006.01)

(52) U.S. Cl.
CPC .............. *G06F 3/1267* (2013.01); *G06F 3/121* (2013.01); *G06F 3/1234* (2013.01); *G06F 3/1285* (2013.01)
USPC .......................... 358/1.13; 358/1.15; 358/1.16

(58) Field of Classification Search
None
See application file for complete search history.

(56) References Cited

U.S. PATENT DOCUMENTS

| | | | |
|---|---|---|---|
| 7,180,619 B2 * | 2/2007 | Ferlitsch ...................... 358/1.15 |
| 2003/0053109 A1 * | 3/2003 | Lester et al. .................. 358/1.14 |
| 2009/0024942 A1 * | 1/2009 | Pendergast et al. ........... 715/764 |
| 2011/0051158 A1 * | 3/2011 | Yamahata et al. ............. 358/1.9 |
| 2012/0062915 A1 * | 3/2012 | Hirama .......................... 358/1.9 |
| 2012/0092695 A1 * | 4/2012 | Masuyama ................... 358/1.14 |
| 2012/0206761 A1 * | 8/2012 | Uotani ......................... 358/1.15 |
| 2012/0224192 A1 * | 9/2012 | Osaka ............................ 358/1.6 |
| 2012/0229852 A1 * | 9/2012 | Kubo et al. .................. 358/1.15 |
| 2012/0230709 A1 * | 9/2012 | Sakaguchi ..................... 399/27 |
| 2013/0222841 A1 * | 8/2013 | Masuyama ................... 358/1.14 |

FOREIGN PATENT DOCUMENTS

| | | | |
|---|---|---|---|
| JP | 2009-039938 A | 2/2009 |
| JP | 2009-118082 A | 5/2009 |

* cited by examiner

*Primary Examiner* — Satwant Singh
(74) *Attorney, Agent, or Firm* — Canon USA Inc IP Division (57) ABSTRACT

An image forming apparatus that executes a job includes a receiving unit configured to receive a cancel instruction for the job after the job processing is started and before the job is completed; and a control unit configured to perform control, by determining a cause of the cancel instruction received for the job, to switch between a processing in which the job is saved in a saving unit as a job to be re-processed and a processing in which the job is not treated as a job to be re-processed.

8 Claims, 12 Drawing Sheets

JOB HISTORY                     4001

| PRINT | SEND | RECEIVE | SAVE |

PRINT JOB HISTORY

| TIME | USER NAME | JOB NAME | RESULT | RE-EXECUTION |
|------|-----------|----------|--------|--------------|
| 10:00 | UserA | PrintDoc | SUCCESSFUL | AVAILABLE |
| 10:05 | UserB | DocB | FAILED | AVAILABLE |
| 10:06 | UserA | DocA | FAILED | UNAVAILABLE |

| DETAILED INFORMATION | RE-EXECUTE | DELETE |

STATUS CONFIRMATION     6001

| PRINT | SEND | RECEIVE | SAVE |

PRINT JOB LIST

| TIME | USER NAME | JOB NAME | STATUS |
|------|-----------|----------|--------|
| 10:00 | UserA | PrintDoc | PRINTING |
| 10:05 | UserB | DocB | WAITING |
| 10:06 | UserA | DocA | WAITING |

| DETAILED INFORMATION | CANCEL |

| ERROR CODE | ID | ERROR CAUSE | RE-EXECUTION AVAILABILITY |
|---|---|---|---|
| 501 | cancel_id_function_restriction | FUNCTION RESTRICTED. NOT EXECUTABLE BECAUSE THE USER IS NOT AUTHORIZED TO EXECUTE THIS FUNCTION. | UNAVAILABLE |
| 502 | cancel_id_function_disable | NO FUNCTION. NOT EXECUTABLE BECAUSE THE SETTING OR CONFIGURATION IS INSUFFICIENT. | AVAILABLE |
| 650 | cancel_id_security_error | SECURITY BREACH. NOT EXECUTABLE BECAUSE THE DOCUMENT IS CONFIDENTIAL. | UNAVAILABLE |
| 101 | cancel_id_user_cancel | CANCEL BY THE USER'S INSTRUCTION. | AVAILABLE |
| 710 | cancel_id_data_error | IMPROPER JOB DATA | UNAVAILABLE |
| | | | |

FIG.11

FIG.12

IMAGE FORMING APPARATUS, CONTROL METHOD OF IMAGE FORMING APPARATUS, AND STORAGE MEDIUM

BACKGROUND

1. Field of the Disclosure

Abstract of the present invention relates to an image forming apparatus that saves therein an executed job in a re-executable format.

2. Description of the Related Art

Recently, an image forming apparatus provided with a storage device, such as a large-capacity hard disk, has been offered. For example, some image forming apparatuses, such as a multifunction peripheral, have the function to save the setting of electronic document data or a job, which has been used for once-executed printing or sending processing, in the apparatus to allow a user to make a selection afterward for easy reprinting or resending. With this function, the user can change the destination setting to resend a once-sent electric document to another destination without having to read the original document again, or can reuse the setting included in a once-printed electronic document to print another document. Thus, the function increases user convenience.

Japanese Patent Application Laid-Open No. 2009-039938 discusses a system that allows the user to use the print setting for a print job in such a way that, when the print operation of a print job for which the print setting is specified is canceled, the user can flexibly use the print setting for the print job whose print operation has been canceled.

When receiving a request to cancel the print operation of a print job, this system also receives a special instruction that specifies the reuse of the processing condition of the job whose print operation is to be canceled. By receiving this instruction, the system is configured to display the setting screen on which the processing condition of the print job whose print operation is to be canceled is reflected, so that the user can reuse the processing condition.

Japanese Patent Application Laid-Open No. 2009-118082 discusses a system for saving a scan setting or a print setting in an information processing device on a network to allow the user to use the setting at the time of restart. The system saves a setting in this way to enable the user to reference and use the setting information not only from a particular scanner or printer but from any other scanner or printer, thereby suppressing a decrease in user convenience.

When the user cancels a print operation, the system receives an instruction that specifies whether to record information about a print job to be canceled. Among print jobs to be cancelled, some print jobs are reusable, but some are not reusable.

For example, when a multifunction peripheral cannot execute printing because of an error or inconsistency in the setting items which the user specified for a print job, the image forming apparatus automatically cancels the print job in some cases. Such a print job cannot be executed even if the user specifies the execution of the print job again for reuse. An attempt to execute the print job again will result in a cancellation again.

In a send job, when a user-scanned document or mail is sent to a mail server or a file server, the user may find an error in the destination and cancel the job while sending the document or mail. Because such a send job can be re-executed by changing the setting of the destination, it is desirable to save the canceled send job for reuse. With the prior art, whether a job can be re-executable cannot be determined correctly, and saving a non-re-executable job cannot increase user convenience.

SUMMARY

Aspects of the present invention relates to an image forming apparatus capable of performing, during execution of a received job processing and when a cancel instruction for the job is received, cancellation processing according to a cause of the cancel instruction.

According to an aspect, an image forming apparatus that executes a job includes a receiving unit configured to receive a cancel instruction for the job after the job processing is started and before the job is completed; and a control unit configured to perform control, by determining a cause of the cancel instruction received for the job, to switch between a processing in which the job is saved in a saving unit as a job to be re-processed and a processing in which the job is not treated as a job to be re-processed.

According to an exemplary embodiment of the present invention, during execution of a received job processing and when a cancel instruction for the job is received, an image forming apparatus can perform cancellation processing according to a cause of the cancel instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
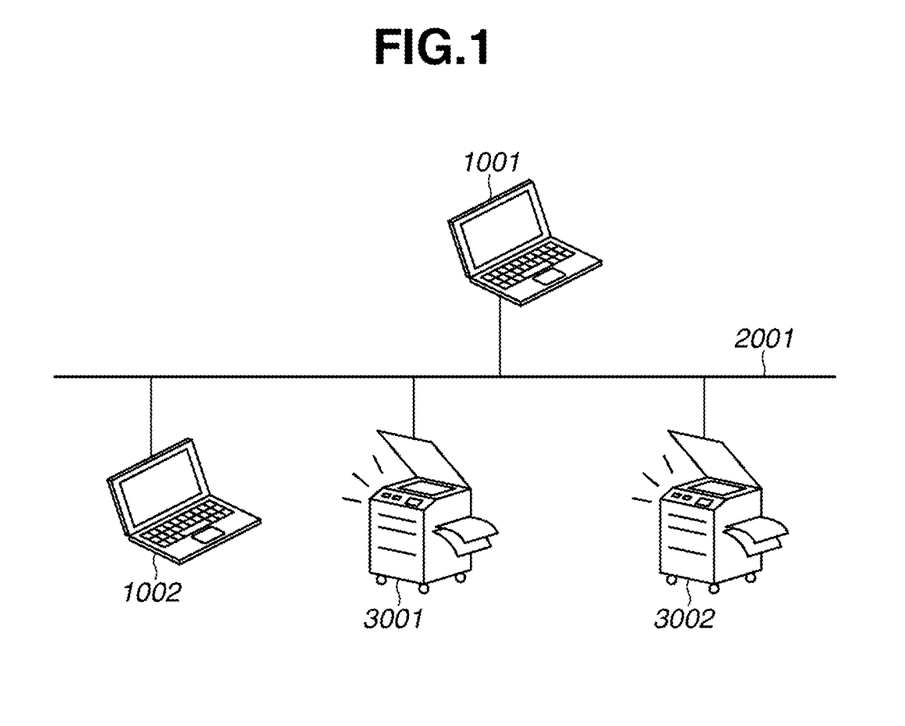
FIG. 1 is a diagram illustrating a configuration of an image processing system that includes an image forming apparatus according to a first exemplary embodiment.

FIG. 1 is a diagram illustrating a configuration of an image processing system that includes an image forming apparatus according to a first exemplary embodiment. Although a print job is used as an example of a job in the description of the exemplary embodiments including the present exemplary embodiment, embodiments of the present invention are applicable not only to a print job but to a job executable by the image forming apparatus such as a send job and a copy job.

In FIG. 1, client personal computers (PC) 1001 and 1002 can communicate with each other via a network 2001. The PCs 1001 and 1002 are connected also to image forming apparatuses 3001 and 3002, each having the copy function and the printer function, for communicating with each other. The client PCs 1001 and 1002 and the image forming apparatuses 3001 and 3002 are configured so that they can communicate with each other via a predetermined protocol for exchanging a print job or device status information.

When a user performs operation on the client PC 1001 (hereinafter simply called the PC 1001) or the client PC 1002 (hereinafter simply called the PC 1002), the PC 1001 or the PC 1002 generates print data. Print data generated by the PC 1001 and the PC 1002 is sent to the image forming apparatus 3001 or the image forming apparatus 3002 for performing print processing.

The image forming apparatus 3001 or the image forming apparatus 3002 interprets the print data, received from the PC 1001 or the PC 1002, converts the interpreted print data to image data, and prints the image data for producing a printed product. An example of the system configuration is not limited to the configuration of the system illustrated in FIG. 1. The present invention may also be provided to a system where a plurality of PCs is connected. Note that the configuration described above is only an example and that the system is not limited to the configuration.

Figure 2:
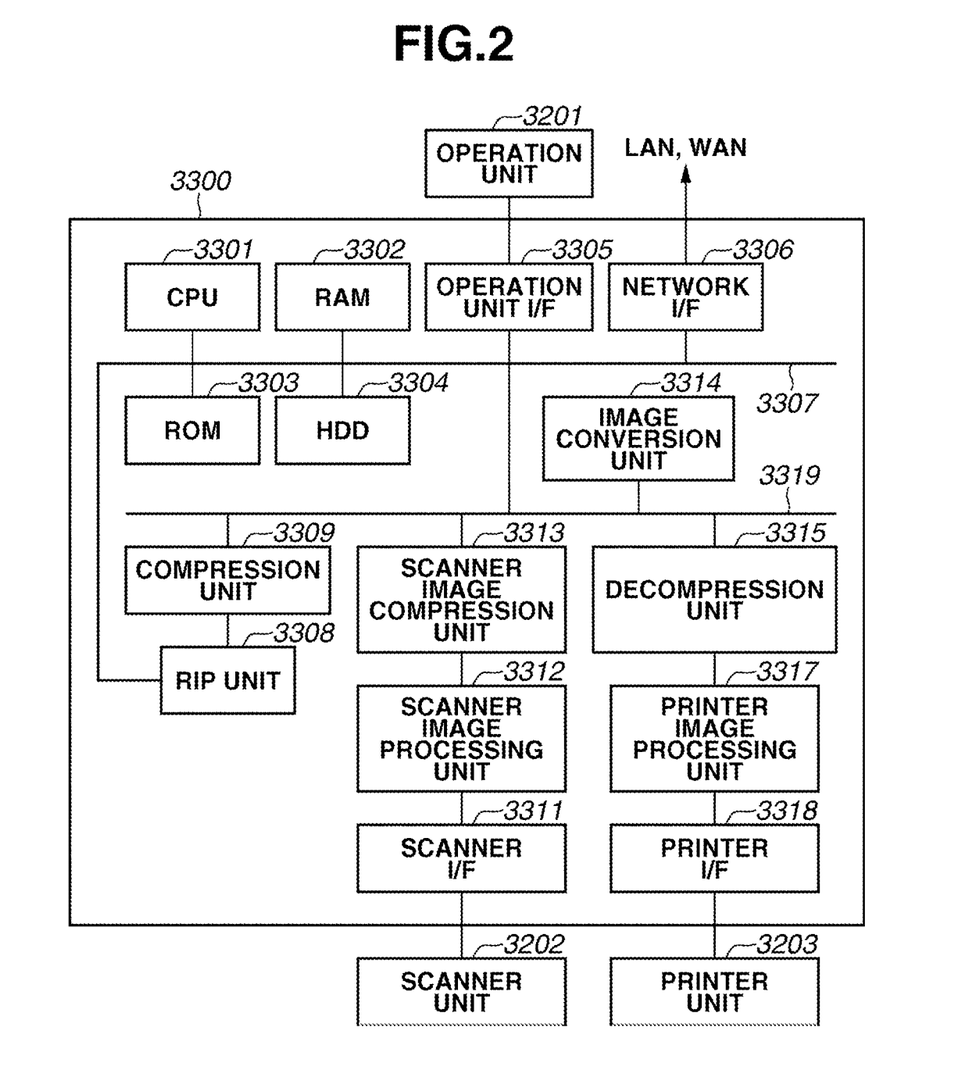
FIG. 2 is a block diagram illustrating a hardware configuration of the image forming apparatus illustrated in FIG. 1.

FIG. 2 is a block diagram illustrating a hardware configuration of a controller 3300 of the image forming apparatuses 3001 and 3002 illustrated in FIG. 1.

Referring to FIG. 2, the controller 3300 is electrically connected to a scanner unit 3202 and a printer unit 3203. At the same time, the controller 3300 is connected to the PC 1001 or the PC 1002, or to an external device, via a local area network (LAN) or a wide area network (WAN) so that communication can be carried out. This connection enables image data or device information to be input and output using a predetermined protocol.

A central processing unit (CPU) 3301 integrally controls accesses from various connected devices based on the control program stored in a read only memory (ROM) 3303. At the same time, the CPU 3301 integrally controls various types of processing performed in the controller 3300. A random access memory (RAM) 3302 is a system work memory for the operation of the CPU 3301 as well as a memory for temporarily storing image data. The ROM 3303 stores a boot program of the apparatus. A hard disk drive (HDD) 3304 can store system software and image data.

An operation unit interface (I/F) 3305 is an interface unit for connection between a system bus 3307 and an operation unit 3201. The operation unit 3201, including a touch panel and a display unit, is configured to display various types of UI screens described below based on the display control of the CPU 3301. This operation unit I/F 3305 receives image data to be displayed on the operation unit 3201 from the system bus 3307, outputs the received image data to the operation unit 3201 and, at the same time, outputs the information received from the operation unit 3201 to the system bus 3307.

A network I/F 3306 connects to the LAN, the WAN, and the system bus 3307 for inputting and outputting information. An image bus 3319, a transmission line for sending and receiving image data, includes a Peripheral Components Interconnect (PCI) bus or an Institute of Electrical and Electronic Engineers (IEEE) 1394 cable.

A scanner image processing unit 3312 corrects, processes, and edits image data received from the scanner unit 3202 via a scanner I/F 3311. A scanner image compression unit 3313 receives image data and compresses the received data. A decompression unit 3315 decompresses data, rasterizes the decompressed data, and sends the rasterized data to a printer image processing unit 3317.

The printer image processing unit 3317 receives image data from the decompression unit 3315 and performs image processing for the image data while referencing the attribute data attached to the image data. The image data for which image processing has been performed is sent to a printer I/F 3318 for printing on paper by the printer unit 3203.

An image conversion unit 3314 performs predetermined conversion processing, such as rotation, color space conversion, binary-to-multivalued conversion, image synthesis, or thinning, for image data.

A raster image processor (RIP) unit 3308 receives intermediate data, generated based on print description language (PDL) record data sent from the PC 1001 or PC 1002, and generates bit map data (multivalued data). The generated bit map data is compressed by a compression unit 3309 and is sent to the image bus 3319.

Figures 3A, 3B:
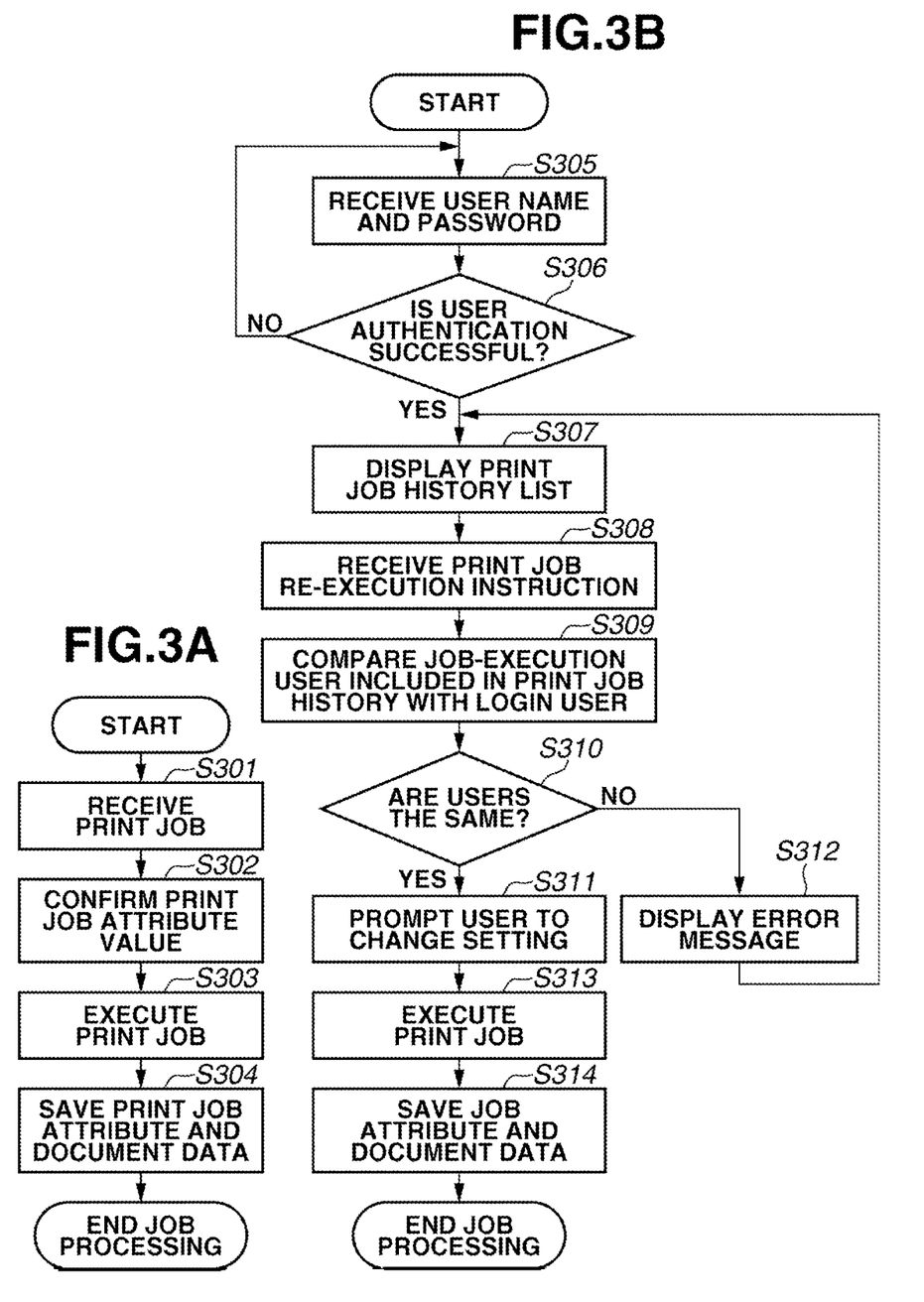
FIG. 3A and FIG. 3B are flowcharts illustrating a control method of the image forming apparatus.

FIG. 3A and FIG. 3B are flowcharts illustrating the control method of the image forming apparatus in the present exemplary embodiment. This example is a job processing example of the image forming apparatus 3001. The CPU 3301 reads a program, which executes the steps, from the ROM 3303 and expands the program in the RAM 3302 for execution by the CPU 3301. FIG. 3A illustrates the print processing of a print job in the image forming apparatus 3001.

First, in step S301, the CPU 3301 of the image forming apparatus 3001 receives information or description of a print job to be processed or executed specified by the user on the PC 1001. In the present exemplary embodiment, information of a print job includes a job attribute value indicating the setting value for printing and image data indicating a document image to be printed. The print job attribute value includes the attribute values related to printing, such as the color setting, screen setting, and finisher setting such as stapling, as well as information about the name of a user who specifies printing and a domain name.

Next, in step S302, the CPU 3301 analyzes the received information of the print job and confirms the print job attribute value that is set in the print job. In step S303, the CPU 3301 performs processing for the image data of the received print job data via the RIP unit 3308, image conversion unit 3314, and printer image processing unit 3317 of the image forming apparatus 3001 and then performs print processing via the printer unit 3203. Last, in step S304, the CPU 3301 saves the image data, for which the print processing has been completed, along with the print job attribute value, in the HDD 3304, which is the storage device of the image forming apparatus 3001. The CPU 3301 terminates the job processing.

Referring to the flowchart illustrated in FIG. 3B, the following describes the re-print processing that is performed using the image data and the print job attribute value saved in the HDD 3304 in step S304.

First, in step S305, the image forming apparatus 3001 receives a user name and a password entered by the user on the operation unit 3201 to perform the login operation. The image forming apparatus 3001 compares the received user name and password with the information in the user management database (DB) managed by the image forming apparatus 3001, to perform user authentication processing. According to the present exemplary embodiment, the user management DB is stored in the HDD 3304, which is the storage device of the image forming apparatus 3001, but user authentication may also be performed using an external authentication server. In that case, the image forming apparatus 3001 sends an inquiry to the user authentication server connected to the network via the network I/F 3306 based on the received user name and password.

Next, in step S306, the CPU 3301 determines whether the received user name and password match the information in the user management DB managed by the image forming apparatus 3001, to check that the user authentication is successful. In step S307, if the user authentication is successful (Yes in step S306), the CPU 3301 displays the print-job history list screen on the operation unit 3201 to receive a user instruction.

On the other hand, if the CPU 3301 determines that the user authentication fails in step S306 (No in step S306), the image forming apparatus 3001 displays a message on the operation unit 3201 indicating that the user authentication failed. After that, the processing returns to step S305 to display the login screen again.

Next, in step S307, the image forming apparatus 3001 displays the print-job history list on the operation unit 3201 when an instruction to display the print-job history is received from the user.

Figure 4:
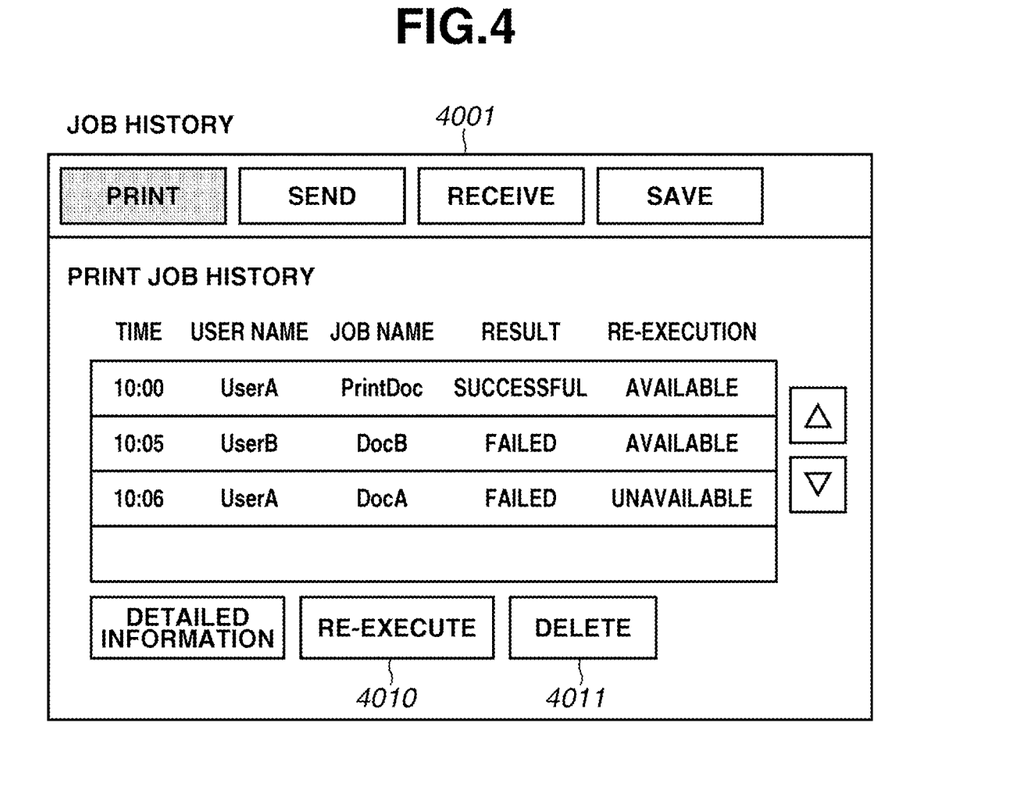
FIG. 4 is a diagram illustrating an example of a user interface (UI) screen displayed on the operation unit illustrated in FIG. 2.

FIG. 4 is a diagram illustrating an example of a user interface screen displayed on the operation unit 3201 illustrated in FIG. 2. This is an example of the UI confirmation screen display in which the print-job history list is displayed.

The job history screen illustrated in FIG. 4 displays a list of print jobs already executed by the image forming apparatus 3001 along with information about the time, user name, job name, result, and re-execution availability. In the Result column, "Successful" or "Failed" is displayed as the result of job processing execution.

"Successful" is displayed when a print job was completed normally. "Failed" is displayed when a job was automatically canceled during print job execution due to an error or when the execution of a print job was prematurely ended, for example, because the user canceled the print job during printing.

In the Re-execution column, "Available" is displayed when the job attribute value and the image data for re-execution are stored in the HDD 3304, which is a storage device, and "Unavailable" is displayed when that information is not stored.

The user selects a job from the job history list and presses a "Re-execute" button 4010 to request that the job be re-executed.

To delete data stored for re-execution, the user presses a "Delete" button 4011. Then, the job attribute value and the image data are deleted from the HDD 3304. As described below, the "Re-execute" operation and the "Delete" operation can be executed only for a print job the user executed, but cannot be executed for a print job other users executed.

Next, in step S308, the CPU 3301 receives the "re-execution" instruction for one of the print jobs included in the print job history list. Then, in step S309, the CPU 3301 compares the user, who executed the selected print job, with the login user to check that the two users are the same. In step S310, the CPU 3301 determines whether the two users are the same. If the users are not the same (No in step S310), then in step S312, the CPU 3301 displays a message indicating an execution error on the operation unit 3201. After that, the processing returns to step S3307 to display the print-job history list screen.

On the other hand, if the two users are the same in step S310 (Yes in step S310), then in step S311, the CPU 3301 displays the screen (not illustrated), via which the user can change the job setting for re-execution, on the operation unit 3201. Next, in step S313, the CPU 3301 executes the print job, that is, the CPU 3301 reflects the content of the received setting change on the job attribute and then causes the printer unit 3203 to print the image data. In step S314, the CPU 3301 saves the job attribute and the image data in the HDD 3304, which is the storage device of the image forming apparatus 3001, with the normal termination information added to the saved data. After that, the CPU 3301 terminates this processing.

The flow of processing for re-execution, which allows the user to reuse a once-printed job, has been described. Although the print job is described as an example of job execution in the present exemplary embodiment, a copy job may also be processed in the present exemplary embodiment. In that case, the user operates the operation unit 3201 and prints image data read from the scanner unit 3202 on the printer unit 3203.

The same flow is applicable also to other jobs such as a send job that sends image data read from the scanner unit 3202 to an external storage server via the network I/F 3306.

Figure 5:
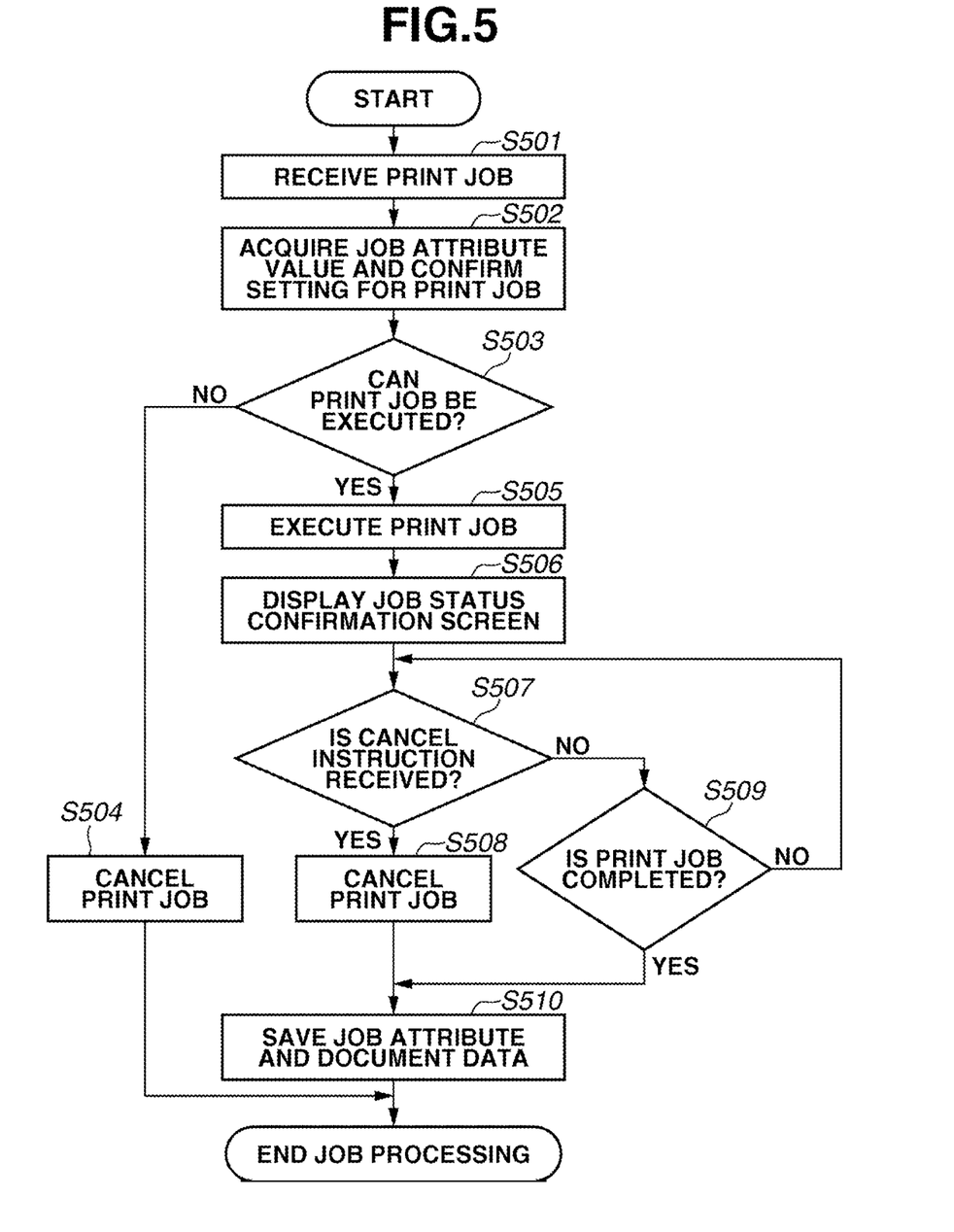
FIG. 5 is a flowchart illustrating a control method of the image forming apparatus.

Referring to FIG. 5, the following describes the processing that is performed when a job received by the image forming apparatus 3001 during the print processing described in FIG. 3A is canceled. In FIGS. 3A and 3B, the flow is described for saving print job data in the HDD 3304 after job execution for later use in re-execution. The flow in the first exemplary embodiment is described for saving print job data including a canceled job data after job cancellation, in the HDD 3304.

A job is canceled due to one of the following two cases: (1) the apparatus automatically cancels the job due to inconsistency between the job setting and the apparatus setting and (2) the user explicitly cancels the job. In the latter case, for example, the user may cancel the job because a setting error is found after the job is started. In that case, the user is likely to be re-executed. Thus, the flow according to the first exemplary embodiment includes processing for determining whether to save job data according to the cause of cancellation.

FIG. 5 is a flowchart illustrating a control method of the image forming apparatus in the present exemplary embodiment. This example is a processing example in which the image forming apparatus 3001 cancels a print job. Each step is executed by reading a program from the ROM 3303 and then expanding the program in the RAM 3302 for execution by the CPU 3301. In the description below, assume that each step is controlled by software executable by the CPU 3301. The following describes a sequence of processing in which the CPU 3301 receives an instruction to cancel a job during the processing of the job that is started but not yet ended, determines the cause of cancellation of the job, and saves the job data, which is in execution, in the HDD 3304 to allow the job to be re-processed. First, in step S501, the CPU 3301 receives a print job from the PC 1001. As in FIG. 3A, the image forming apparatus 3001 receives the print job, which is sent to the image forming apparatus 3001 as a print job from the PC 1001.

Next, in step S502, the CPU 3301 acquires the job attribute value from the print job and confirms the setting for the print job. In addition, the CPU 3301 acquires the setting value, which is set in the image forming apparatus 3001 as the apparatus setting, and the configuration information about the image forming apparatus.

In step S503, the CPU 3301 compares the acquired setting value of the print job with the specification information about the image forming apparatus 3001 (information about apparatus setting and apparatus configuration) to determine whether the print job is executable. For example, if stapling is specified in the setting for the print job but if a finisher for performing stapling is not provided in the configuration of the image forming apparatus, the CPU 3301 determines that the job cannot be executed. If it is determined that the print job cannot be executed (No in step S503), then in step S504, the CPU 3301 cancels the print job and terminates the execution of the job processing. In this case, because the print job cannot be executed even if the re-execution is attempted, the CPU 3301 immediately terminates the print job execution without saving the job attribute and the image data. Examples of a print job, which is determined in step S503 as a re-executable job, include a job that can be executed by removing a jam or by changing the setting value. Examples of a print job, which is determined as non-re-executable, include a print job that is canceled because of access limitations (department identification (ID) error, Access control limitation target, and exceeding the upper limit number of sheets used). In addition, examples of a non-re-executable print job include a print job in which the data of a received job has a data format that cannot be used or a print job in which the amount of data is too large to be processed because of memory limitations.

Figure 6:
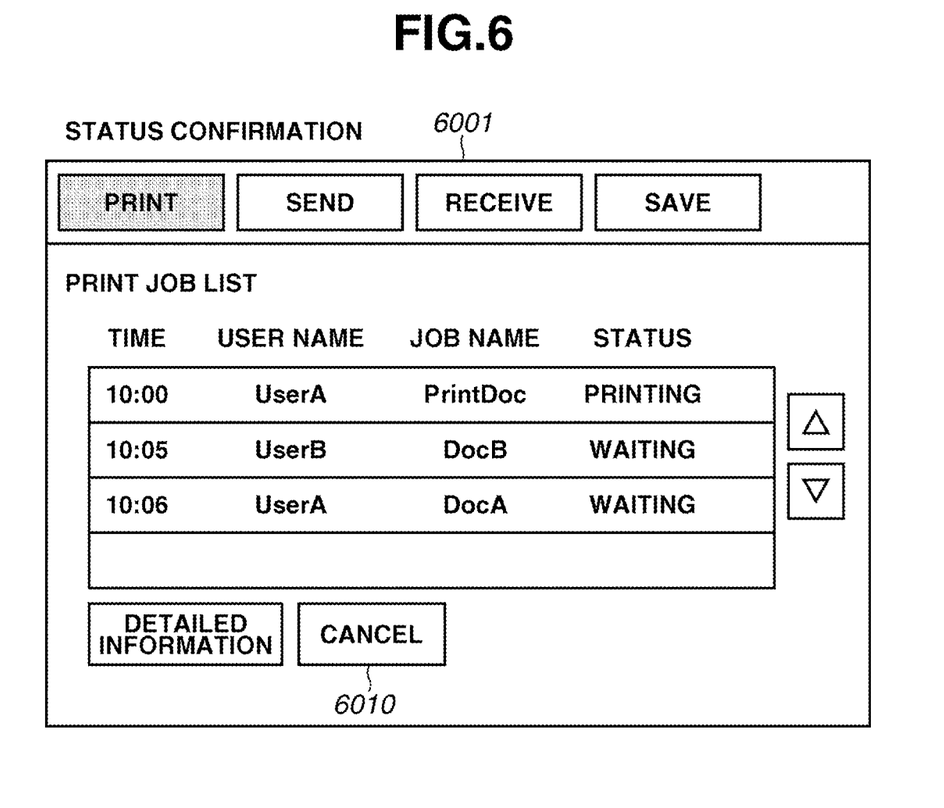
FIG. 6 is a diagram illustrating an example of a UI screen displayed on the operation unit illustrated in FIG. 2.

On the other hand, if it is determined in step S503 that the print job is executable (Yes in step S503), then in step S505, the CPU 3301 executes the print job. Next, in step S506, when an instruction to display the print job in execution is received from the operation unit 3201, the CPU 3301 displays the status confirmation screen on the operation unit 3201. FIG. 6 is a diagram illustrating an example of the job status confirmation screen displayed on the operation unit 3201.

As illustrated in FIG. 6, when the image forming apparatus 3001 receives a print job from the PC 1001, the CPU 3301 displays the print jobs on the status confirmation screen as a list. On this status confirmation screen, the information about the job input time, user name, job name, and the status for each print job is displayed as a list. To "cancel" a print job in execution, the user selects one print job from the jobs in execution displayed on the operation unit 3201 and then presses a "Cancel" button 6010.

If the "cancel" instruction is received from the user via the UI screen illustrated in FIG. 6 in step S507 (Yes in step S507), then in step S508, the CPU 3301 of the image forming apparatus 3001 cancels the execution of the selected print job. In step S510, the CPU 3301 associates the job attribute and the image data with the job history so that the canceled print job can be re-executed, saves the job attribute and the image data in the HDD 3304, which is the storage device of the image forming apparatus 3001, as a job to be re-processed, and terminates the processing.

On the other hand, if it is determined in step S507 that the "cancel" instruction is not received (No in step S507), the CPU 3301 determines in step S509 whether the print job is completed. If the CPU 3301 determines that the print job is completed (Yes in step S509), the processing proceeds to step S510. On the other hand, if the CPU 3301 determines that the print job is not completed (No in step S509), the processing returns to step S507 to allow the "cancel" instruction to be received for the print job. On the other hand, if the print job is completed (Yes in step S509), then in step S510, the CPU 3301 associates the job attribute and the image data with the job history so that the executed print job can be re-executed and saves the job attribute and the image data in the HDD 3304, which is the storage device of the image forming apparatus 3001, and then terminates the processing.

As described above, if an instruction to cancel the processing operation (such as printing or sending) of a received job is received during the processing, the image forming apparatus according to the present exemplary embodiment accurately determines whether to save the information about the job according to the cause of cancellation to allow the user to selectively save the information about the job that the user is likely to reuse. This configuration eliminates the need to save all canceled jobs, thereby reducing the user's load involving in reprocessing to efficiently restart the job processing, and thus increasing user convenience.

In the flow described in the first exemplary embodiment, the job attribute and the image data are not saved for a job that the image forming apparatus 3001 automatically cancels, but are saved for a print job that the user explicitly cancels. However, according to the first exemplary embodiment, it is difficult for the user to know what print jobs are recorded. A second exemplary embodiment of the present invention describes a method for providing the setting, which allows the user to select whether to record the job attribute and the image data, in the image forming apparatus 3001.

Figure 7:
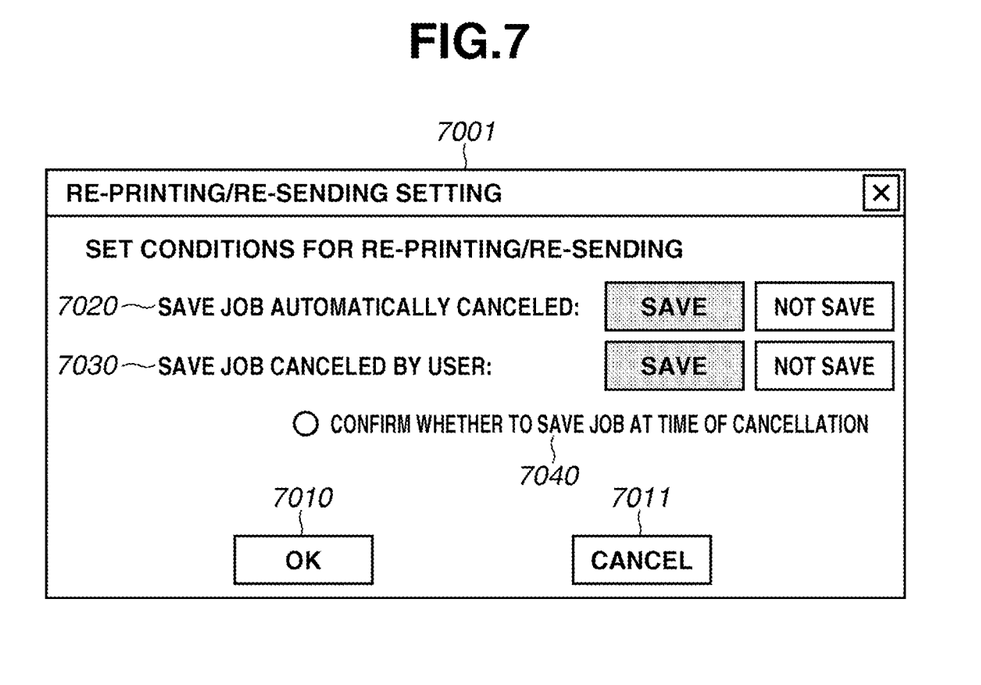
FIG. 7 is a diagram illustrating an example of a UI screen displayed on the operation unit illustrated in FIG. 2 according to a second exemplary embodiment.

FIG. 7 is a diagram illustrating an example of a user interface displayed on operation unit 3201 illustrated in FIG. 2. This example illustrates an example of a UI screen 7001 on which re-printing or re-sending is specified for the image forming apparatus.

The setting screen illustrated in FIG. 7 is configured such that the user can select whether to save the job attribute and the image data for each of a setting 7020 for automatically canceling a print job and a setting 7030 for explicitly canceling a print job by the user. For a print job explicitly canceled by the user, a button 7040 is provided to allow the user to confirm in advance whether the job attribute and the image data are saved when the print job is canceled. As a setting in the image forming apparatus, there has been described the method for providing the setting as illustrated in FIG. 7. In addition, per-user settings may be provided. In FIG. 7, an OK button 7010 and a Cancel button 7011 are provided.

Figure 8:
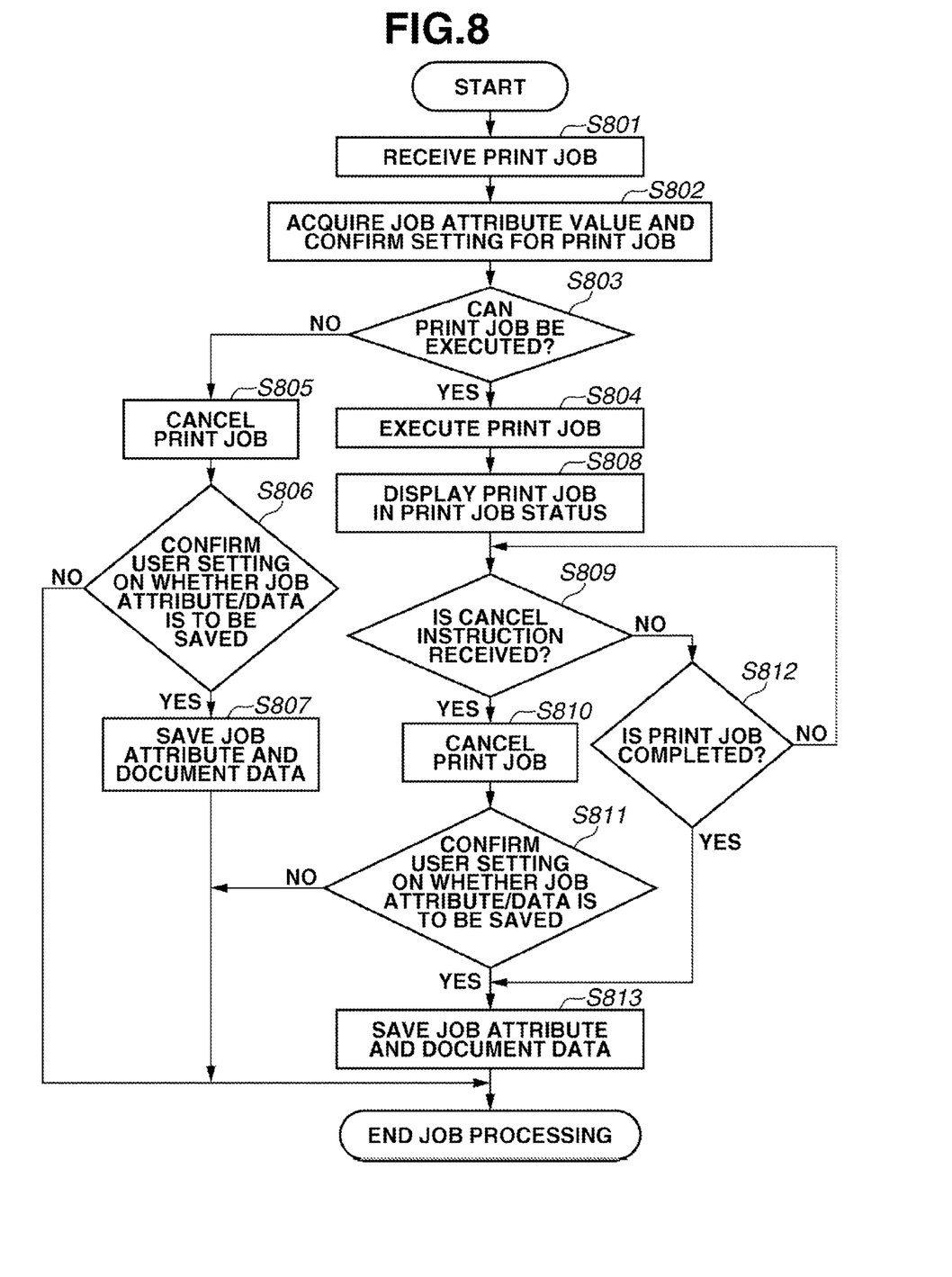
FIG. 8 is a flowchart illustrating a control method of an image forming apparatus.

FIG. 8 is a flowchart illustrating a control method of an image forming apparatus in the present exemplary embodiment. This example is a processing example in which the image forming apparatus 3001 cancels a print job. Each step is executed by reading a program from the ROM 3303 and then expanding the program in the RAM 3302 for execution by the CPU 3301. The following describes execution determination processing and re-execution determination processing. In the execution determination processing, the CPU 3301 compares the attribute value of a received job and a particular cause of cancellation to determine whether the job is to be executed. In the re-execution determination processing, the CPU 3301 determines whether the job is re-executable by changing attribute of the job. In addition, based on the execution determination processing and the re-execution determination processing, the following describes in detail the switching processing. The CPU 3301 switches between the processing in which the CPU 3301 saves the job in the saving unit as a job to be executed and then terminates the job and the processing in which the CPU 3301 does not process the job as a job to be re-executed and then terminates the job.

Because the processing operations from the reception of a job (step S801 in FIG. 8) to the cancellation of the job (step S805 and step S810 in FIG. 8) are similar to those of the corresponding steps in FIG. 5 in the first exemplary embodiment, the following describes the processing in step S806 and subsequent steps.

In step S806, the CPU 3301 references the setting screen illustrated in FIG. 7 to determine whether the user-specified setting value for the image forming apparatus is set to "Save". If the CPU 3301 determines that "Save" is selected for the setting 7020 for the saving of a print job that is automatically canceled (Yes in step S806), the processing proceeds to step S807. In step S807, the CPU 3301 saves the job attribute and the image data in the HDD 3304 as the data of a job to be re-executed.

On the other hand, if the CPU 3301 determines in step S806 that "Not save" is selected for the setting 7020 for the saving of a job that is automatically canceled (No in step S806), the CPU 3301 discards the job data and terminates the job processing.

If a cancel instruction is received from the user in step S809 (Yes in step S809), the CPU 3301 cancels the print job in step S810, and then in step S811, confirms the setting value for the image forming device that is set by the user using the screen in FIG. 7. If the CPU 3301 determines that "Save" is selected for the setting 7030 for the saving of a print job that is canceled by a user (Yes in step S811), the processing proceeds to step S813. In step S813, the CPU 3301 saves the job attribute and the image data in the HDD 3304 and terminates the job processing.

Figure 9:
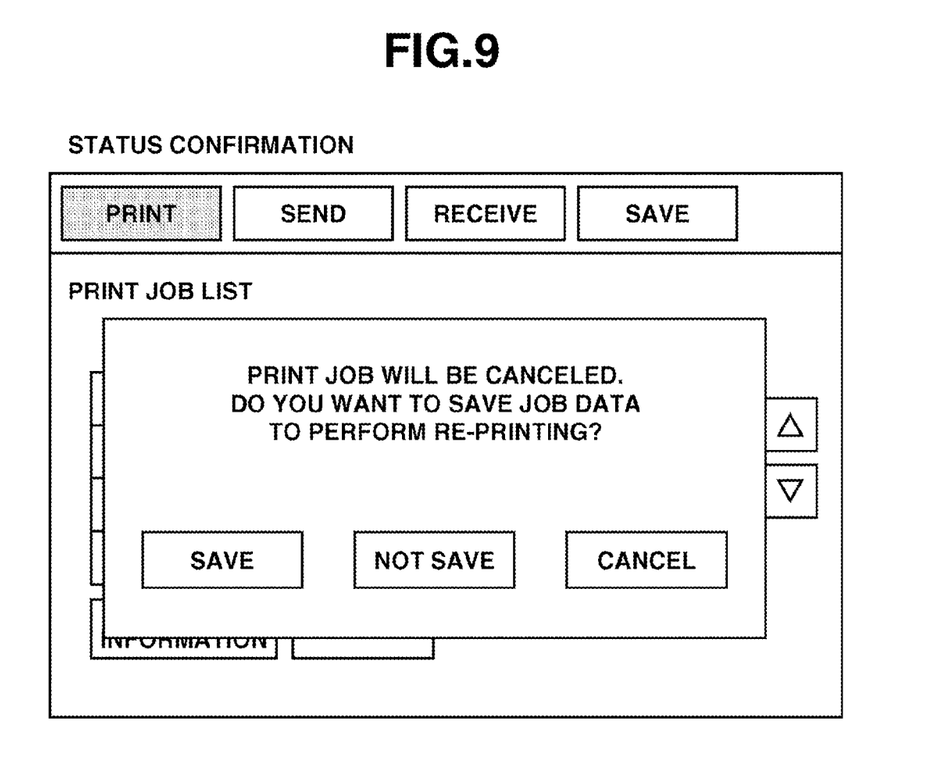
FIG. 9 is a diagram illustrating an example of a UI screen displayed on the operation unit illustrated in FIG. 2.

In addition, if it is determined that the "Confirm whether to save job at time of cancellation" is set, the CPU 3301 displays a UI screen, corresponding to the first confirmation screen display such as the one illustrated in FIG. 9, on the operation unit 3201. If the CPU 3301 determines that "Save" is received from the user on this UI screen (Yes in step S811), the processing proceeds to step S813 to save the job attribute and the image data.

On the other hand, if the CPU 3301 determines that the "Not save" is received on the UI screen illustrated in FIG. 9 or if the CPU 3301 determines that the setting 7030 for the image forming apparatus confirmed in step S811 is "Not save" (No in step S811), the CPU 3301 discards the job data and terminates the job processing.

If the CPU 3301 determines that "cancel" instruction is not received in step S809 (No in step S809), the processing proceeds to step S812. In step S812, the CPU 3301 determines whether the execution of the print job is completed. If the CPU 3301 determines that the execution of the print job is not yet completed (No in step S812), the processing returns to step S809 to allow the "cancel" instruction to be received for the print job.

On the other hand, if it is determined in step S812 that the execution of the print job is completed (Yes in step S812), then in step S813, the CPU 3301 associates the job attribute and the image data with the job history so that the executed job can be re-executed and saves the job attribute and the image data in the HDD 3304, which is the storage device of the image forming apparatus 3001, and then terminates the processing.

In this way, the present exemplary embodiment can determine whether to save job data for reuse according to the user's desire, thereby further increasing user convenience.

A configuration may also be available in which the processing described above and the processing illustrated in FIG. 5 are combined as necessary. In this case, a first control mode and a second control mode are available. In the first control mode, the CPU 3301 receives a cancel instruction for a job during the job processing, which is already started but not yet completed, determines the cause of cancellation of the job, and saves the job in execution in the HDD 3304 as a job to be re-processed. In the second control mode, the CPU 3301 saves a job, which cannot be executed because of the specifications of the image forming apparatus illustrated in FIG. 8, in the HDD 3304 as a job to be re-processed.

In the first exemplary embodiment described above, the job attribute and the image data are not saved in the HDD 3304 for a print job automatically canceled by the image forming apparatus 3001. However, depending upon the cause of cancellation, some print jobs that are automatically canceled can be re-executed and the user may re-execute those print jobs later. The following describes in detail the cases in which a job can be re-executed and the cases in which a job cannot be re-executed.

Examples of causes by which the image forming apparatus 3001 automatically cancels jobs are given below. In the description below, the jobs include a print job, a send job that sends data, and a copy job that reads and prints a document.

(1) A job is canceled because the contents that are set as the job attribute include processing not authorized by the user, and therefore the execution of the job is not allowed.

(2) A job is canceled because the contents that are set as the job attribute are inappropriate, and therefore the image forming apparatus, which receives the job, cannot execute the job.

(3) A job is canceled because the received document data is confidential, and therefore the execution of the job is inhibited.

When the cause of cancellation is the one described in (2), the job can be executed by changing the job setting by the user at the time of re-execution. In that case, saving the job attribute and the image data in the apparatus allows the user to execute the job without re-entering the image data, thus increasing user convenience. On the other hand, when the cause of cancellation is the one described in (1) or (3), the job will be canceled again if re-execution is requested by the same user. In this case, saving the job attribute and the image data in the apparatus is useless and, in addition, the user may misunderstand that the job, if saved, may be re-executed.

Figure 10:
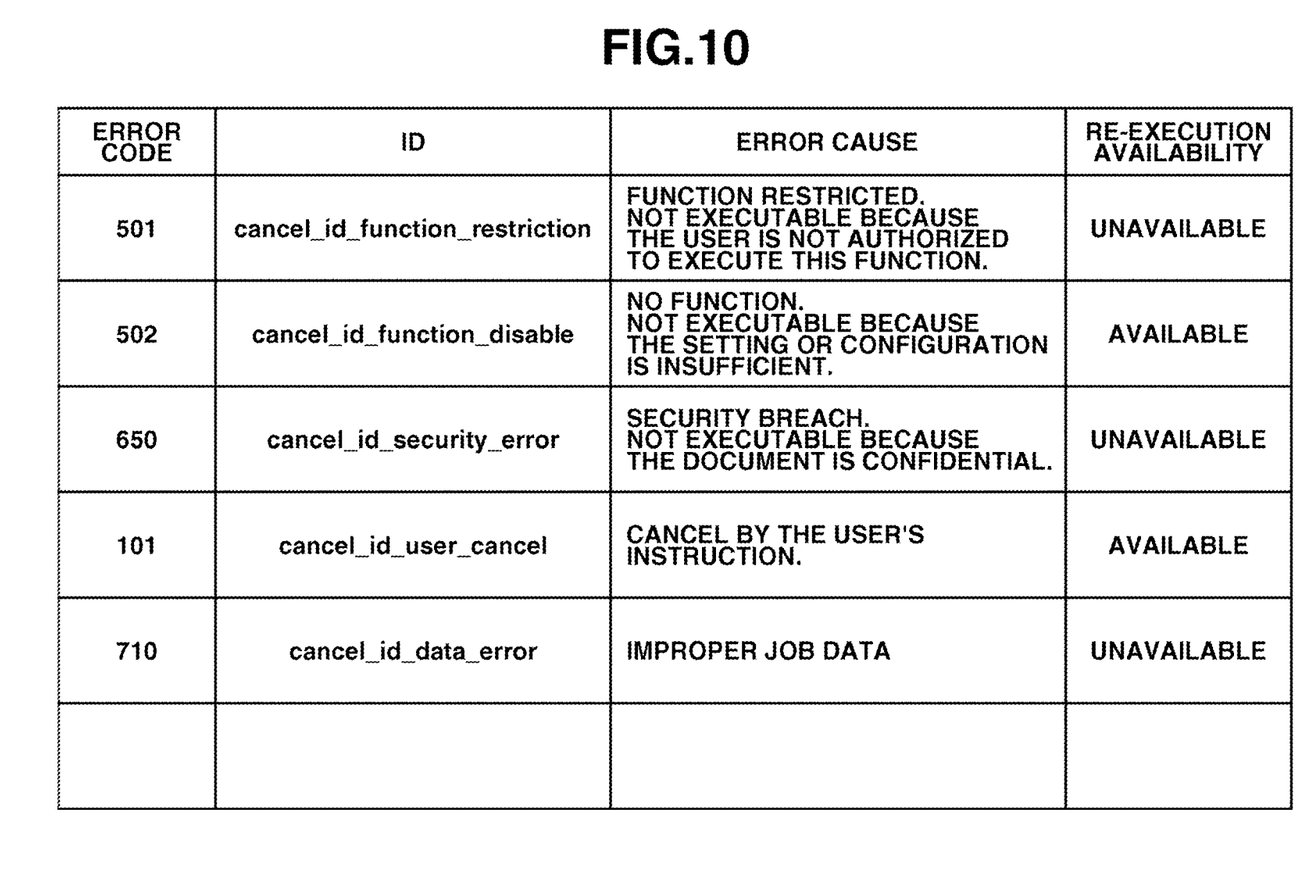
FIG. 10 is a diagram illustrating a table for managing error causes according to a third exemplary embodiment.

To address this problem, a third exemplary embodiment provides a table that stores information indicating, for each cause of job cancellation, whether a job is executable. FIG. 10 is a diagram illustrating an example of a table that stores information about causes of job cancellation and whether a job is re-executable (re-execution availability).

Referring to FIG. 10, the table stores information about "error code", "ID", "outline of error cause", and "re-execution availability". The "error code" is a code displayed in the job history. The causes of cancellation described above correspond to the IDs as follows: cause (1) corresponds to "cancel_id_function_restriction", case (2) corresponds to "cancel_id_function_disable", and case (3) corresponds to "cancel_id_security_error". For each cause, the table stores whether the job is re-executable ("Available") or not ("Unavailable") as "Re-execution availability". This table may be coded in a program in advance and stored in the ROM 3303 of the image forming apparatus 3001 or may be stored in the HDD 3304, the storage device of the image forming apparatus 3001, for reading by the program.

A processing example of the present exemplary embodiment is as follows. If the job is determined as un-executable in step S503 illustrated in FIG. 5 (No in step S503), the CPU 3301 compares the cause with the table illustrated in FIG. 10 to determine whether the job can be re-executed. If it is determined that the job can be re-executed, the CPU 3301 saves the job attribute and the image data in the HDD 3304. On the other hand, if it is determined that the job cannot be re-executed, the CPU 3301 discards the job data and terminates the job processing.

In this way, the present exemplary embodiment can selectively save re-executable jobs, and the user can easily search for a job when re-executing the job, thereby further increasing user convenience.

The following describes a case in which, when a print job is canceled in the first to third exemplary embodiments, the reception of the image data of the job is halfway through, and all image data required for job execution has not yet been received by the image forming apparatus 3001. This occurs, for example, when a job is automatically canceled or canceled by the user during the reception of a print job or when a job is canceled while the scanner unit 3202 is reading a plurality of sheets of a document during copy processing.

In this case, because the reception of image data is halfway through, re-execution can be performed only for partial image data even if the image data is saved for use in re-execution. A fourth exemplary embodiment describes the processing performed for a job for which the reception of image data is canceled before the reception is completed.

Figure 11:
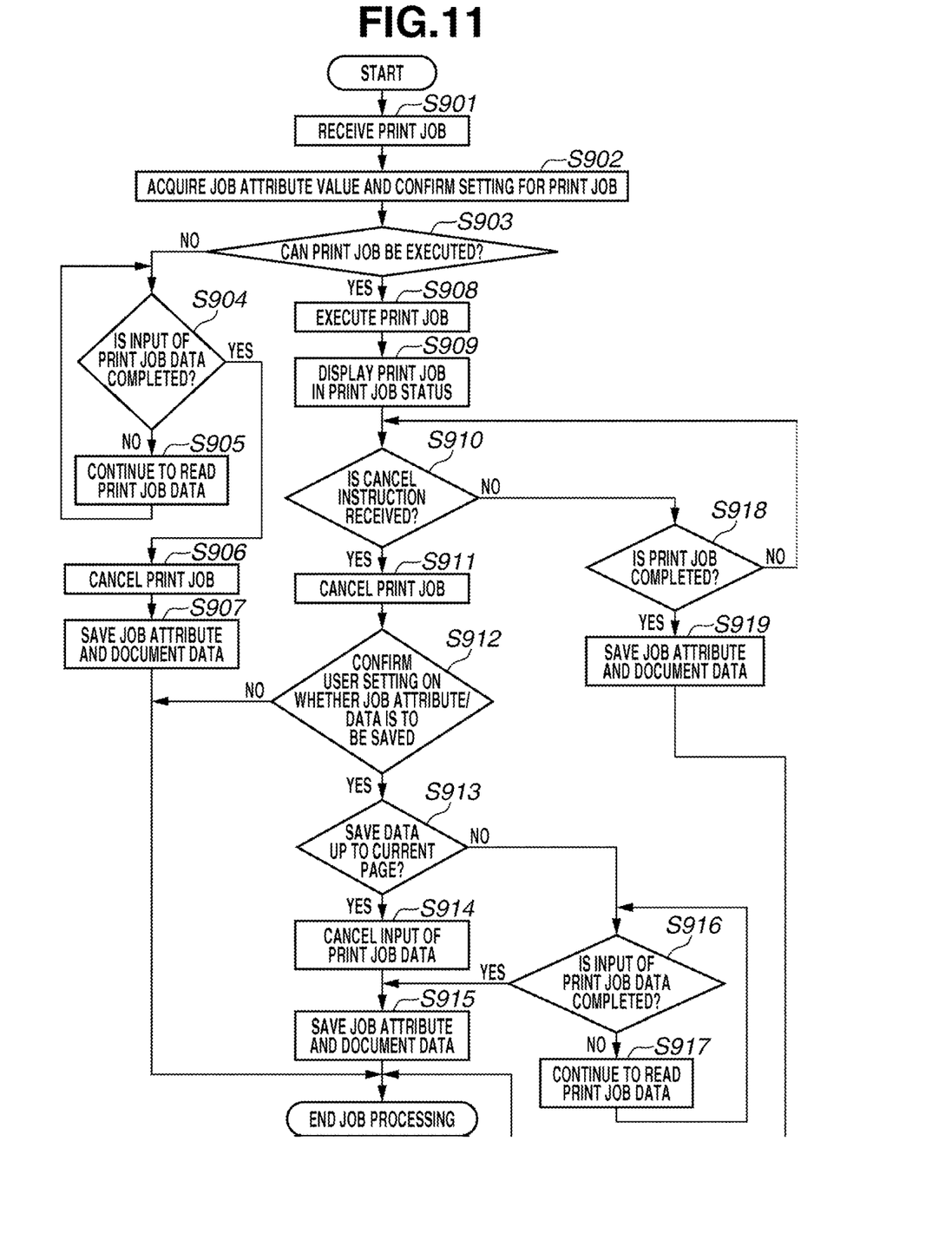
FIG. 11 is a flowchart illustrating a control method of an image forming apparatus according to a fourth exemplary embodiment.

FIG. 11 is a flowchart illustrating a control method of an image forming apparatus according to the fourth exemplary embodiment. This example is a processing example in which the image forming apparatus 3001 cancels a print job. Each step is executed by reading a program from the ROM 3303 and then expanding the program in the RAM 3302 for execution by the CPU 3301. Because the processing operations in steps S901 and S902 are similar to those of the corresponding steps in the exemplary embodiments described above, the description is omitted. The following describes an example of processing to continue print job data reception processing to be completed in the two cases: (1) when the CPU 3301 determines that a print job cannot be executed and (2) when a cancel instruction is received for an already-started print job. Note that the CPU 3301 performs processing for continuing the reception processing of print job data after the completion determination processing (step S904 or S916 described below) is executed to determine whether the reception processing for the job is completed.

If it is determined in step S903 that the job cannot be executed as in FIG. 5 (No in step S903), then in step S904, the CPU 3301 determines whether the reception of the print job (all image data) is completed. In step S906, the CPU 3301 cancels the print job if it is determined that the reception of all image data is completed (Yes in step S904). In step S907, the CPU 3301 saves the job attribute and the image data and then terminates the job.

On the other hand, if it is determined in step S904 that the reception of image data is halfway through (No in step S904), the CPU 3301 performs first continuation processing in step S905 to continue reading the image data of the job until the reception of all image data is completed. If the CPU 3301 determines in step S904 that the reception of all image data is completed (Yes in step S904), the processing proceeds to step S906.

If it is determined in step S910 that a cancel instruction is received from the operation unit 3201 (Yes in step S910), the CPU 3301 displays on the operation unit 3201 a UI screen (such as the one illustrated in FIG. 12) corresponding to a second confirmation screen display on which user is requested to confirm whether the setting and the image data are to be saved.

Figure 12:
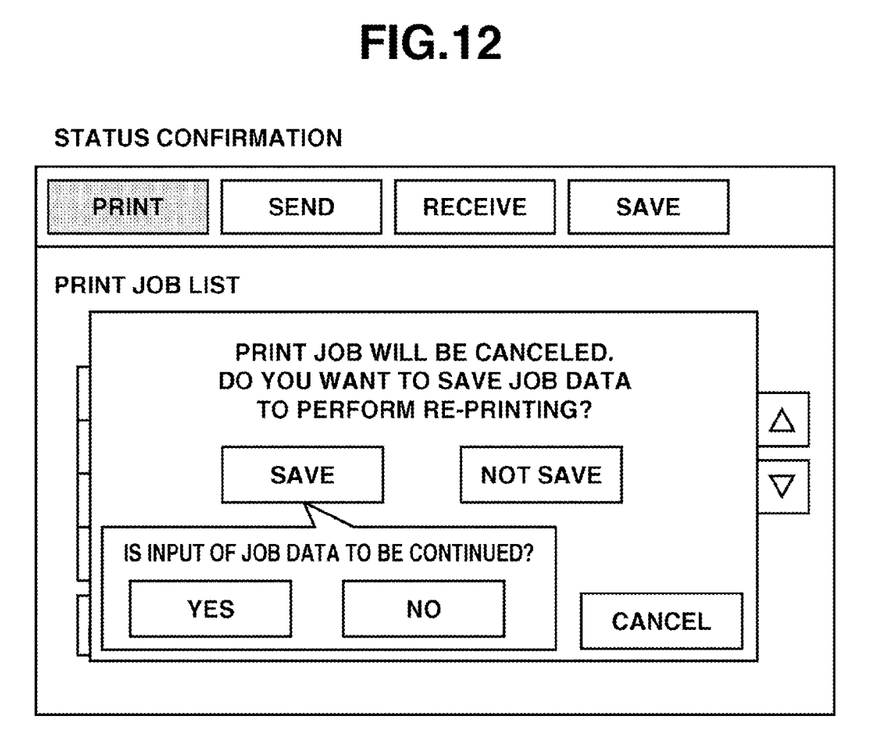
FIG. 12 is a diagram illustrating an example of a UI screen displayed on the operation unit illustrated in FIG. 2.

In step S913, if the user selects "Save" on the example screen illustrated in FIG. 12 (Yes in step S912), the CPU 3301 receives another instruction from the user on whether to continue the reception of job data. The CPU 3301 receives this instruction to confirm to which point the job attribute and the image data are to be saved, either up to the page for which reception is completed or after the reception of all job data is completed. If the CPU 3301 determines that the instruction "No" is received from the user (No in step S913), the processing proceeds to step S916 to continue the reception of job data until the reception is completed. The CPU 3301 performs second continuation processing to continue the read processing in step S917 until the reception of job data is completed.

If the CPU 3301 determines in step S913 that the instruction "Yes" is received (Yes in step S913), the processing proceeds to step S914. In step S914, the CPU 3301 cancels the reception of job data. In step S915, the CPU 3301 saves the job attribute and the image data up to the page for which processing is completed.

On the other hand, if the CPU 3301 determines in step S910 that the "cancel" instruction is not received (No in step S910), the processing proceeds to step S918. In step S918, the CPU 3301 determines whether the execution of the print job is completed.

In step S918, if the CPU 3301 determines that the print job is not completed (No in step S918), the processing returns to step S910 to allow an instruction to be received for "canceling" the print job. If it is determined that the print job is completed (Yes in step S918), then in step S919, the CPU 3301 associates the job attribute and the image data with the job history so that the executed print job can be re-executed and saves the job attribute and the image data in the HDD 3304, which is the storage device of the image forming apparatus 3001, and then terminates the processing.

In this way, the present exemplary embodiment can determine whether to save job data for reuse according to the user's desire, thereby increasing user convenience.

In addition, the image data up to the page the user desires can be used at the time of re-execution.

The steps according to the exemplary embodiments may also be implemented by executing software (a program), obtained via a network or various types of storage medium, on a processing device (a CPU or a processor) of a personal computer (a computer).

The present invention is not limited to the exemplary embodiments described above but various modifications (including an organic combination of the exemplary embodiments) are applicable based on the spirit of the present invention. Those modifications are included in the scope of the present invention.

A sequence of processing that is a combination of a part of the flowcharts illustrated in the exemplary embodiments is included in the exemplary embodiments. In addition, an exemplary embodiment in which a part of steps in the flowcharts are exchanged for execution is also included in the exemplary embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While aspects of the present invention have been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-029127 filed Feb. 14, 2012, which is hereby incorporated by reference herein in its entirety.

What is claimed is:

1. An image forming apparatus that executes a job, the image forming apparatus comprising:
   a receiving unit configured to receive a cancel instruction for the job after the job processing is started and before the job is completed;
   a display unit configured to display confirmation screen based on a cause of the cancel instruction received for the job, the confirmation screen receiving a save instruction for saving the job in a saving unit; and
   a control unit configured to perform control, when the save instruction is received from a user via the confirmation screen, to save the job in a saving unit as a job to be re-executed.

2. The image forming apparatus according to claim 1, wherein the control unit including:
   a unit configured to determine whether the job is to be executed by comparing an attribute value of the job with a particular cancellation cause; and
   a unit configured to perform control, by changing the attribute value of the job to determine whether the job is re-executable if the job is determined not to be executed, to switch between a processing in which the job is saved in a saving unit as a job to be re-executed and a processing in which the job is not treated as a job to be re-executed.

3. The image forming apparatus according to claim 1, wherein the control unit including:
   a unit configured to perform control, by determining a cause of the cancel instruction received for the job, to switch between a processing in which the job is saved in a saving unit as a job to be re-processed and a processing in which the job is not treated as a job to be re-processed;
   a unit configured to determine whether the job is to be executed by comparing an attribute value of the job with a particular cancellation cause; and
   a unit configured to perform control, by changing the attribute value of the job to determine whether the job is re-executable if the job is determined not to be executed, to switch between the processing in which the job is saved in a saving unit as a job to be re-executed and the processing in which the job is not treated as a job to be re-executed.

4. The image forming apparatus according to claim 1, further comprising: a completion determination unit configured to determine whether reception processing for the job is completed if the job is determined not to be executed; and a first continuation processing unit configured to continue the reception processing for the job until the reception processing for the job is completed if the reception processing for the job is determined not to have been completed.

5. The image forming apparatus according to claim 1, further comprising: a second continuation processing unit configured to continue, when the cancel instruction is received, reception processing for data until the reception processing for data of the job having received the cancel instruction is completed.

6. The image forming apparatus according to claim 1, further comprising: a second confirmation screen display unit configured to display, when the cancel instruction is received, a confirmation screen on a display unit until reception processing for data of the job having received the cancel instruction is completed, the confirmation screen receiving an instruction specifying whether to continue the reception processing for data.

7. A method for controlling an image forming apparatus that executes a job, the method comprising:
   receiving a cancel instruction for the job after the job processing is started and before the job is completed;
   displaying a confirmation screen based on a cause of the cancel instruction received for the job, the confirmation screen receiving a save instruction for saving the job in a saving unit; and
   performing control when the save instruction is received from a user via the confirmation screen, to save the job in the saving unit as a job to be re-executed.

8. A non-transitory computer-readable storage medium storing a program that causes a computer to execute the method according to claim 7.

* * * * *